United States Patent [19]

Natov et al.

[11] Patent Number: 4,594,372
[45] Date of Patent: Jun. 10, 1986

[54] POLYVINYL CHLORIDE COMPOSITION

[75] Inventors: Miltcho A. Natov; Stefanka V. Vassileva, both of Sofia; Hristo B. Kotchev, Pleven; Zvetan S. Djagarov, Pleven; Nikola N. Popov, Pleven, all of Bulgaria

[73] Assignee: Vish Chimiko-Technologitcheski Institute, Sofia, Bulgaria

[21] Appl. No.: 644,780

[22] Filed: Aug. 27, 1984

[30] Foreign Application Priority Data

Aug. 25, 1983 [BG] Bulgaria .................. 62196

[51] Int. Cl.⁴ .................. C08K 9/04; C08L 97/02
[52] U.S. Cl. ................... 523/208; 524/14; 524/430; 524/433; 524/567
[58] Field of Search ............ 524/13, 14, 430, 433, 524/567, 563; 523/208

[56] References Cited

U.S. PATENT DOCUMENTS 2,558,378  6/1951  Petry .................. 524/13
3,546,158  12/1970  Champion, Jr. et al. .......... 524/13
4,194,996  3/1980  Babina et al. .............. 524/14

FOREIGN PATENT DOCUMENTS 2456179  6/1975  Fed. Rep. of Germany ...... 523/208

Primary Examiner—John Kight
Assistant Examiner—Nathan M. Nutter

[57] ABSTRACT

The invention relates to an improved polyvinyl chloride composition useful in the construction and furniture industries, and particularly for the manufacture of furniture slaps and profiles.

The present invention eliminates that activation of the wood meal ingredient with an aqueous solution of resol phenol formaldehyde resin, thereby eliminating a second drying step known to cause defects in the final product, due to gas evolution. In addition, the present invention represents an improvement in appearance and mechanical strength.

3 Claims, No Drawings

POLYVINYL CHLORIDE COMPOSITION

BACKGROUND OF THE INVENTION

This invention relates to an improved polyvinyl chloride composition useful in the construction and furniture industries, for the production of synthetic sheets, slabs, profiles, and other articles.

Compositions which contain or resemble wood are important in the construction and furniture industries, and many such compositions are known. Anenkov V. F., Drevesnie polimernie materiali i technologuii chenia, M. 1974; and Hrulev M. V., Polyvinylchlorid, Izd. "Tehnika", C. 1977.

Polyvinyl chloride compositions are known in the art. One such composition contains a stabilizer, plasticizer, lubricant, pigment, and wood meal treated in advance with an aqueous solution of resol phenol formaldehyde resin. Avt. svidetestvo na Bulgaria, N. 29 944. Prior to combination with polyvinyl chloride, the wood meal is crushed and dried, followed by impregnation with an aqueous solution of resol phenol formaldehyde resin and a second drying at 120° C. A disadvantage of this composition is that a second drying is required. Incomplete drying results in defects in the finished particles due to the evolution of gases during preparation of the composition. These defects in turn result in a decrease in the strength of the finished material.

SUMMARY OF THE INVENTION

The improved polyvinyl chloride composition of the present invention contains one or more stabilizers, a plasticizer, one or more lubricants, pigment, wood meal, novolak phenol formaldehyde resin, formalin, and calcium oxide, calcium hydroxide, or magnesium oxide. The improvement resides in the use of the phenol formaldehyde resin, hardened by Formalin in the presence of a metallic oxide, in combination with known ingredients mixed in advantageous proportion. The result is a polyvinyl chloride composition superior in quality, appearance and strength, prepared without a second drying step and without the defects inherent in that step.

The present invention contains, by weight, 100 parts polyvinyl chloride, 1-12 parts stabilizer, 1-5 parts lubricant, 1-15 parts calcium carbonate, 0.5-5 parts coloring agent, 0.25-3 parts matting additives, 1-75 parts plasticizer, 5-95 parts wood meal of particle size 100-500 microns, 0.05-23.75 parts solidified or unsolidified novolak phenol formaldehyde resin (1-15% by weight of the wood meal), 6 parts Formalin (up to 25% of the resin) and up to 5 parts (20% by weight of the resin) of calcium oxide, calcium hydroxide, or magnesium oxide.

The stabilizers of the present invention are lead subphosphite, lead stearate, and lead phosphite in a ratio of 3:0.6:1, or calcium stabilizers such as calcium stearate or calcium carbonate, or epoxidized vegetable oils, or a combination of these stabilizers. A preferred lubricant is a combination of 0.5-2 parts stearin, 0.5-1.2 parts alkyl esters of the dicarboxylic acids, and 1-2 parts wax or paraffin. A preferred matting additive is 0.25-3 parts titanium dioxide, and a preferred plasticizer is diisooctylphthalate.

The ingredients of the present invention are combined in a two-stage closed mixer, followed by extrusion of the composition into a sheet material, a profile, a tube, or some other article.

The polyvinyl chloride composition of the present invention provides several advantages over the art. The material is waterproof and moisture resistant, is readily processed without difficulty due to the low viscosity of the melt, resembles wood in appearance, is without gas evolution defects, and can be hammered, nailed, glued, stamped, colored in bulk, colored superficially, or varnished. In addition, the composition possesses high tensile, impact, and flexural strength.

Representative examples of the invention are summarized in Table I. It will be appreciated by those skilled in the art that these embodiments are exemplary only, and do not serve to limit the scope of the invention.

TABLE I

| N. | Constitution in parts by weight | Examples 1 | 2 | 3 | 4 | 5 | 6 |
|---|---|---|---|---|---|---|---|
| 1. | PVC - suspended | 100.0 | 100.0 | 100.0 | 100.0 | 100.0 | 100.0 |
| 2. | Wood meal | 28.5 | 28.5 | 28.5 | 80.0 | 80.0 | 38.5 |
| 3. | Stabilizers | | | | | | |
| | lead subphoshite | — | 3.0 | 3.0 | 3.0 | 3.0 | 3.0 |
| | lead stearate | 1.5 | 0.6 | 0.6 | 0.6 | 0.6 | 1.5 |
| | lead sulphite | — | 1.0 | 1.0 | 1.0 | 1.0 | 1.0 |
| | calcium stearate | — | 2.0 | 2.0 | 2.0 | 2.0 | 1.5 |
| | calcium carbonate | — | 5.0 | 5.0 | 5.0 | 5.0 | 4.5 |
| | expoxidized soya bean oil | — | 5.0 | 5.0 | 5.0 | 5.0 | 2.0 |
| 4. | Plasticizers | | | | | | |
| | dibutyl phthalate | 10.0 | — | — | — | — | — |
| | diisooctyl phthalate | — | 8.0 | 8.0 | 8.0 | 8.0 | — |
| 5. | Lubricants | | | | | | |
| | montan wax | 1.0 | — | — | — | — | — |
| | ester of dicarboxylic acid with acyclic alcohols | — | 1.2 | 1.2 | 8.0 | 0.8 | 1.0 |
| | inside lubricant | — | 0.6 | 0.6 | — | — | 0.6 |
| | stearin | — | 2.0 | 2.0 | — | — | 0.2 |
| 6. | Titanium dioxide | — | 0.6 | 0.5 | 0.5 | 0.5 | 1.5 |
| 7. | Chlorinated polyethylene | — | — | — | — | — | 3.0 |
| 8. | Phenolformaldehyde resin resol (40% aqueous solution) in weight parts of the dry substance | 7.1 | — | — | — | — | — |
| | novolak | — | 2.850 | 2.850 | 8.0 | 8.0 | 3.850 |
| 9. | Formalin, 37% | — | — | 0.3 | — | 0.8 | 0.5 |
| 10. | Calcium hydroxide | — | — | 0.150 | — | 0.4 | 0.3 |

The improved composition is prepared according to the following steps. The wood meal and phenol formaldehyde resin are combined in a two-stage closed mixer at 150° C. for 20 minutes, in the presence of calcium oxide and and Formalin. The polyvinyl chloride is combined with the remaining ingredients (according to Table I) in a two-stage mixer at 120° C. for 10 minutes together with the activated wood meal. The dry mixture is extruded to sheets at a temperature of 165°–185° C. at the separate zones of the extrusion cylinder and 165°–185° C. at the separate zones of the profiling head.

The physical and mechanical characteristics of the composition are summarized in Table II.

TABLE II

| Physical and Mechanical Characteristics | | | | | | |
|---|---|---|---|---|---|---|
| | Examples | | | | | |
| Index | 1 | 2 | 3 | 4 | 5 | 6 |
| 1. Tensile strength, MPa | 32.0 | 37.7 | 39.5 | 24.5 | 24.5 | 30.0 |
| 2. Impact strength, kL/m² | 2.9 | 3.2 | 3.5 | 2.2 | 2.7 | 6.0 |
| 3. Static flexural strength, MPa | 4.2 | 4.3 | 5.2 | 3.7 | 3.75 | 4.5 |
| 4. Bending angle, degrees | 10.0 | 21.0 | 18.0 | 16.20 | 16.40 | 21.0 |
| 5. Water absorption for 24 hours in percent | below 1 | below 0.5 | below 1 | below 0.3 | below 0.3 | below 1 |
| 6. Percentage elongation at break, % less than | 15 | 14 | 13 | 12 | 10 | 10 |
| 7. Power loading of the motor by extrusion, kW | 41 | 38 | 38 | 41 | 41 | 40 |

We claim:

1. An improved polyvinyl chloride composition containing stabilizers, plasticizers, lubricants, and wood meal, wherein the improvement comprises an addition consisting of novolak phenol formaldehyde resin, hardened by Formalin in the presence of a metallic agent selected from the group consisting of calcium oxide, calcium hydroxide, and magnesium oxide.

2. An improved polyvinyl chloride composition containing, by weight, 100 parts polyvinyl chloride, 1–12 parts stabilizer, 1–75 parts plasticizer, 1–5 parts lubricant, 1–15 parts calcium carbonate, 5–95 parts wood meal of particle size from 5–1000 microns, 0.05–25 parts novolak phenol formaldehyde resin, up to 6 parts Formalin, and 5 parts metallic agent selected from the group consisting of calcium oxide, calcium hydroxide, or magnesium oxide.

3. A composition as in claim 2, wherein the particle size of the wood meal ranges from 10–100 microns.

* * * * *